Figure 5:
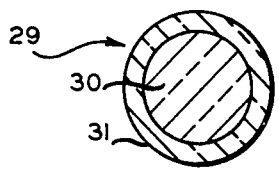

United States Patent

[11] 3,619,068

| [72] | Inventor | Arthur B. Broerman |
| | | Bartlesville, Okla. |
| [21] | Appl. No. | 853,702 |
| [22] | Filed | Aug. 28, 1969 |
| [45] | Patented | Nov. 9, 1971 |
| [73] | Assignee | Phillips Petroleum Company |

[54] REFRACTOMETER
5 Claims, 6 Drawing Figs.

[52] U.S. Cl. .................................................. 356/130,
250/218, 250/227, 350/96 B, 356/133
[51] Int. Cl. ........................................................ G01n 21/46
[50] Field of Search .......................................... 350/96 B;
250/218, 227; 356/128, 130–133

[56] References Cited
UNITED STATES PATENTS

| 2,943,968 | 7/1960 | Freeman et al. | 350/96 B UX |
| 3,068,739 | 12/1962 | Hicks et al. | 250/227 |
| 3,215,135 | 11/1965 | Franke | 350/96 B X |
| 3,520,619 | 7/1970 | Ward | 350/133 X |

*Primary Examiner*—Ronald L. Wibert
*Assistant Examiner*—F. L. Evans
*Attorney*—Young and Quigg

ABSTRACT: A refractometer is formed by a housing having two intersecting passages therethrough. The fluid to be tested is passed through the first passage, and a radiation beam is passed through the second. A bundle of light tubes is positioned in the second passage so that one end of the bundle is disposed in the test fluid at an angle with the axis of the tube bundle. A radiation detector measures the radiation passed through the tube bundle.

PATENTED NOV 9 1971 3,619,068

INVENTOR.
A. B. BROERMAN
BY Young & Quigg
ATTORNEYS

REFRACTOMETER

In various analysis procedures there is a need for apparatus which is capable of detecting changes in composition of fluid streams. One specific example of such a need occurs in the field of chromatography. While thermistor cells and flame detectors have been developed for use in gas chromatography, there remains a need for reliable, low-cost detectors for use in liquid chromatography. It has been proposed to use refractometers for this purpose. However, existing refractometers generally require excessively large volumes of samples and are often expensive to construct. In order to be employed successfully as a detector in liquid chromatography, the refractometer must have an extremely small sample chamber in order to provide a rapid response to changes in composition of the column effluent.

In accordance with this invention, an improved refractometer is provided which is particularly well suited for use as a detector in liquid chromatography. This refractometer is quite simple in construction and is capable of detecting changes in composition of extremely small sample volumes. The refractometer comprises a housing having a passage through which the sample material is directed. A second passage for the transmission of light intersects the first passage at an angle. A refracting element comprising a bundle of optical fibers is disposed in the second passage with the end of the fiber bundle extending into the first passage to contact the fluid being measured. This end of the fiber bundle is tapered at an angle which approximates the critical angle with respect to the material being measured. A radiation detector is positioned at the second end of the bundle to measure the amount of light transmitted through the bundle. As the refractive index of the sample fluid circulated through the first passage changes, the amount of transmitted radiation changes, thereby providing an indication of changes in the refractive index of the sample. The optical fiber bundle advantageously is enclosed in a metal tubing, such as a hypodermic needle. This facilitates construction of the optical element and provides a small volume, rugged refractometer cell.

Figure 6:
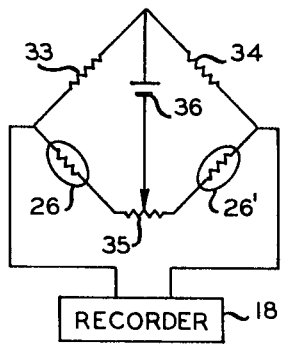
Figure 3:
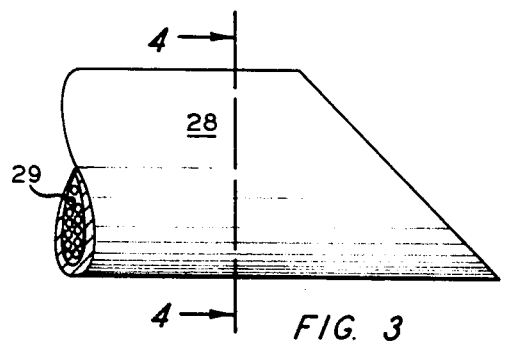
Figure 4:
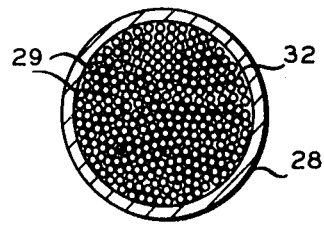
Figure 1:
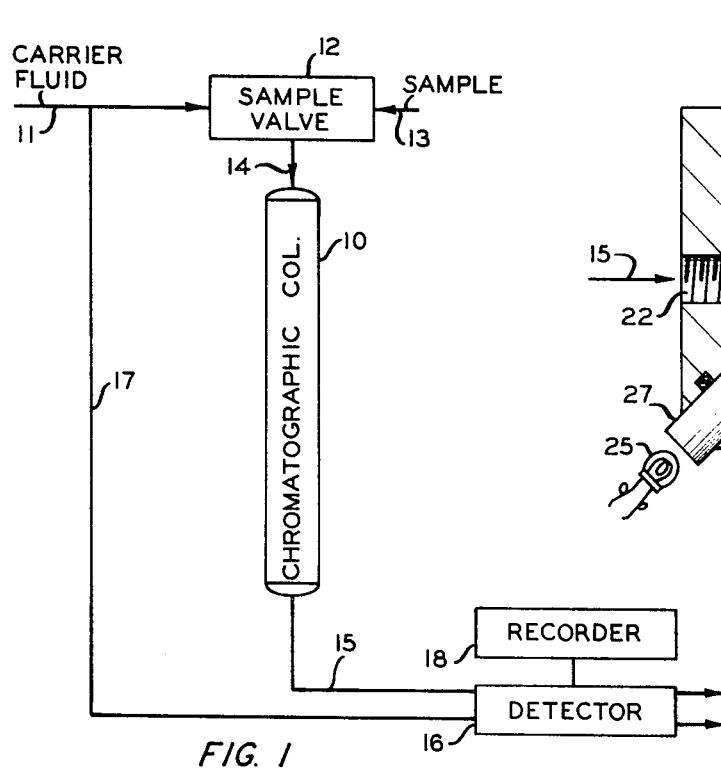
Figure 2:
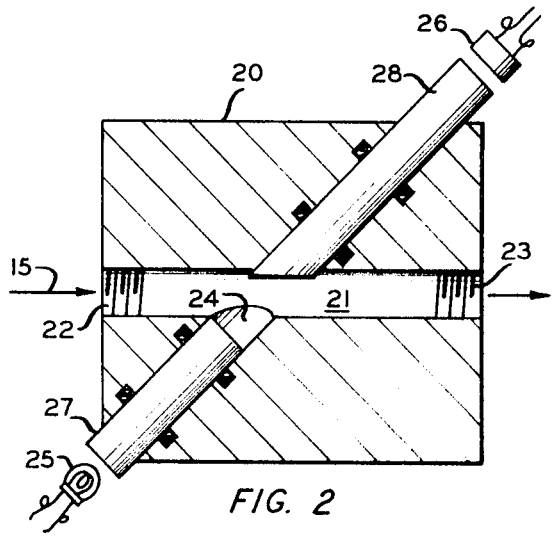

In the drawing, FIG. 1 is a schematic representation of a chromatographic analyzer having the refractometer of this invention employed as the detector. FIG. 2 is a view, shown partially in section, of an embodiment of the refractometer cell assembly. FIG. 3 illustrates the optical fiber bundle and housing employed in the cell assembly of FIG. 2. FIG. 4 is a sectional view taken along line 4—4 in FIG. 3. FIG. 5 is a cross-sectional view of one of the elements of the optical fiber bundle. FIG. 6 is a schematic circuit drawing of the measuring circuit associated with the refractometer.

Referring now to the drawing in detail and to FIG. 1 in particular, there is shown a chromatographic column 10. A carrier fluid, which can be a suitable liquid, is introduced through a conduit 11 which communicates with a sample valve 12. A sample of material to be analyzed is introduced through a conduit 13. A conduit 14 extends from valve 12 to the inlet of column 10. A conduit 15 passes the effluent from column 10 to the first chamber of a detector 16. A portion of the carrier fluid is passed through a conduit 17 to the second channel of detector 16. The output signal from detector 16, which is representative of the difference between compositions of the two fluids passed therethrough, is transmitted to a recorder 18.

The apparatus thus far described constitutes a conventional chromatographic analyzer. Carrier fluid initially passes through column 10 so that the same fluid flows through both channels of detector 16. Periodically, valve 12 is actuated to introduce a predetermined volume of the sample material into column 10. Valve 12 is then returned to its original position so that the carrier fluid forces the sample through the column. The appearance of the constituents of the sample in the effluent from the column results in unbalance of detector 16 so that a signal is applied to the recorder, which is representative of the sample constituents appearing in the column effluent. In accordance with one embodiment of this invention, detector 16 constitutes a differential refractometer of the type to be described.

One channel of the differential refractometer of this invention is illustrated in FIG. 2. A housing 20 is provided with a first passage 21 through which a fluid stream can be circulated. The two ends of the passage 21 are provided with respective ports 22 and 23 which are adapted to receive connecting conduits. As illustrated schematically, conduit 15 can be connected to inlet port 22 so that the column effluent is directed through passage 21. Housing 20 is also provided with a second passage 24 which intersects passage 21 at an angle. Passage 24 is adapted to have radiation transmitted therethrough from a source 25 to a radiation detector 26. The inlet portion of passage 24 can be provided with a radiation-transmitting element 27. This element can comprise a solid rod of radiation-transparent material, a bundle of fiber optics rods, or merely an empty tube having transparent windows at the two ends. The primary purpose of element 27 is to permit the transmission of radiation into the region of passage 21 while preventing test fluid from accumulating in the dead space that would result if element 27 were not present. As an alternative, source 25 can be moved closer to passage 21. Element 27 can be suitably sealed into housing 20 to prevent leakage of fluid from passage 21.

A refracting element is disposed in the outlet portion of passage 24 between passage 21 and detector 26. As illustrated in greater detail in FIGS. 3 and 4, this refractive element comprises a metal tube 28 which contains a large number of fiber optics rods 29. As illustrated in FIG. 5, each of the rods 29 comprises a central core 30 of radiation-transparent material which is provided with a cladding 31 that has a lower refractive index than the central core. A large number of these rods is disposed within tube 28. Tube 28 can advantageously be a metal hypodermic needle of relatively small diameter. Each of the rods 29 can be extremely small, such as in the range of 0.001 to 0.002 inch in diameter. As many as several hundred of these small rods can be disposed within tube 28. The interior region of tube 28 surrounding rods 29 can be filled with an epoxy potting compound 32 to retain tubes 29 in a rigid position when the refractive element is assembled. If this coating has a lower refractive index than the tubes, cladding 31 can be omitted. The end of tube 28 which is inserted into housing 20 is cut at an angle other than 90° with respect to the axis of the tube, as are the ends of tubes 29. The resulting surface can then be highly polished. The angle of the end of tube 28 and the angle at which passage 24 intersects passage 21 are selected so that radiation transmitted through passage 24 strikes the ends of rods 29 at approximately the critical angle when liquid of the type to be tested is positioned in passage 21. Thus, the amount of light transmitted through tube 28 changes if there is a change in refractive index of the test liquid.

In the apparatus illustrated in FIG. 1, detector 16 comprises two refractometer units of the type illustrated in FIG. 2. Fluid from conduit 15 passes through one of the units, and fluid from conduit 17 passes through the other. It is preferred that the two cell units be positioned so that radiation from a single source 25 passes through both units. This eliminates errors which might occur if two separate radiation sources were employed.

A suitable measuring circuit is illustrated schematically in FIG. 6. Detector 26, which advantageously is a photoresistive element, is disposed in one arm of a bridge network. A corresponding detector 26', which is associated with the second channel of detector 16, is connected in a second arm of the bridge. A potentiometer 35 is connected between elements 26 and 26'. Resistors 33 and 34 are connected in series between the other terminals of elements 26 and 26'. A voltage source 36 is connected between the contactor of potentiometer 25 and the junction between resistors 33 and 34. The opposite terminals of the bridge are connected to the respective input terminals of recorder 18. The bridge can be balanced initially by adjustment of the contactor of potentiometer 25 so that a zero output signal results when the same fluid passes through the two channels of detector 26. Thereafter, any change in composition of the column effluent relative to the carrier fluid results in an unbalance of the bridge due to differences in the amount of radiation transmitted to respective detectors 26 and 26'.

In some applications of this invention, it is not necessary to provide a differential refractometer. In this case, only a single cell of the type illustrated in FIG. 2 is needed. Detector 26 can be connected in any type of measuring circuit which is capable of detecting changes in the amount of radiation transmitted through tube 28.

Radiation in the visible, infrared or ultraviolet regions can be employed, depending on the nature of the fluid being tested. An important advantage of the refractometer cell of this invention resides in the fact that passage 21 can have an extremely small volume, which can be of the order of a few microliters, for example. This permits the refractometer cell to be sensitive to rapid changes in composition of the fluid being tested. Another important advantage of the cell assembly illustrated in FIG. 2 resides in the fact that the end of tube 28 is generally parallel to the direction of fluid flow through passage 21. This results in the test fluid wiping across the surface of the refractometer element as the fluid flows through passage 21. The use of a metal tube 28, such as a hypodermic needle, permits low-cost construction of the cell assembly. The ends of the individual rods 29 can be ground much more accurately and rapidly than can a solid glass element.

While this invention has been described in conjunction with presently preferred embodiments, it should be evident that it is not limited thereto.

What is claimed is:

1. A refractometer comprising:
   a housing having a first passage therethrough to receive a fluid to be measured, and a second passage which intersects said first passage;
   a radiation source positioned adjacent one end of said second passage to direct radiation through said second passage and a portion of said first passage;
   a radiation detector positioned adjacent the second end of said second passage to receive radiation from said source via said first passage; and
   a bundle of light transparent rods positioned in said second passage between said source and said detector, the sides of said rods being provided with coatings of material having a refractive index less than the refractive index of the rods, said rods extending generally longitudinally of said second passage and terminating at one end within said first passage so that fluid in said first passage contacts the first ends of said rods, the planes of the faces of the first ends of said rods making an angle other than 90° with the longitudinal axis of said rods, the angle of intersection of said first and second passages and the angle of the plane of the faces of the first ends of said rods being selected relative to a refractive index of said fluid so that radiation transmitted through the fluid strikes said rods at approximately the critical angle of said fluid in said first passage.

2. The refractometer of claim 1, further comprising a metal tube enclosing said bundle of rods.

3. The refractometer of claim 2, further comprising a mass of potting compound positioned within said tube and enclosing the individual rods contained therein.

4. A differential refractometer comprising two refractometer units, each constructed in accordance with the refractometer of claim 1 but having a single common radiation source, and means to compare the outputs of the detectors of the two individual refractometer units.

5. The differential refractometer of claim 4 wherein said detectors are photoresistive elements, and said means to compare comprises a bridge network containing said elements.

* * * * *